United States Patent
Maturo, Jr. et al.

[15] 3,677,571
[45] July 18, 1972

[54] BEACH CART

[72] Inventors: Thomas F. Maturo, Jr., 2535 S. Lincoln Ave., Vineland, N.J. 08360; Frank Prisinzano, Harding Highway, R.D. #1, Richland, N.J. 08350

[22] Filed: Sept. 9, 1970

[21] Appl. No.: 70,673

[52] U.S. Cl. .........................................280/36 R, 280/47.3
[51] Int. Cl. ........................................................B62b 11/00
[58] Field of Search ...............280/47.3, 47.31, 47.19, 47.32, 280/78, 36 R; 301/52

[56] References Cited

UNITED STATES PATENTS

| | | |
|---|---|---|
| 2,967,058 | 1/1961 | Hoffmann...........................280/47.31 |
| 3,198,540 | 8/1965 | Averett................................280/47.3 |
| 1,261,701 | 4/1918 | Chantiny................................301/52 |
| 2,468,604 | 4/1949 | Salat...................................280/36 C |
| 1,414,535 | 5/1922 | Valkenberg......................280/DIG. 3 |

*Primary Examiner*—Benjamin Hersh
*Assistant Examiner*—Robert R. Song
*Attorney*—Clarence A. O'Brien and Harvey B. Jacobson

[57] ABSTRACT

A collapsible tubular frame attaches a carrying bag for storing articles therein. A roller is connected to the frame to allow transport of the cart through sand. The roller is constructed of annular end plates with a cylindrical mesh screen attached to the end plates. The frame includes extending arms for conveniently supporting a beach chair.

3 Claims, 6 Drawing Figures

Patented July 18, 1972

Thomas F. Maturo, Jr.
Frank Prisinzano
INVENTORS

BY Clarence A. O'Brien
and Harvey B. Jacobson
Attorneys

Patented July 18, 1972

Thomas F. Maturo, Jr.
Frank Prisinzano
INVENTORS

BY Clarence A.O'Brien
and Harvey B. Jacobson
Attorneys

BEACH CART

The present invention relates to collapsible carts and more particularly to a lightweight cart having a roller particularly adapted for transport through sand.

In the past, collapsible carts have been devised for the convenience of bathers wishing to transport beach articles across sand. Generally, these prior art devices resemble a collapsible shopping cart equipped with conventional wheels. It has been found that use of conventional wheels is inconvenient for sand and requires undue effort on the part of the user who pulls the cart across the sand. An additional problem of prior art devices resides in the lack of sufficient facilities for storing beach articles as well as supporting beach furniture such as a folding chair.

The present invention obviates the disadvantages of the prior art devices aforementioned. Instead of conventional cart wheels, the present cart employs a large foraminous roller that provides superior traction and minimizes the transporting effort necessary to traverse sand. Further, the frame of the present invention is particularly adapted for easy collapsing and compact storage. The frame includes projecting portions for supporting a folding beach chair. Also, the present invention includes a large bag with several pockets or compartments for storing beach articles.

Although the present invention is particularly directed to a beach cart, as will be appreciated, the principles involved in the structure of the present invention may be utilized for other types of cart vehicles adapted for different terrain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
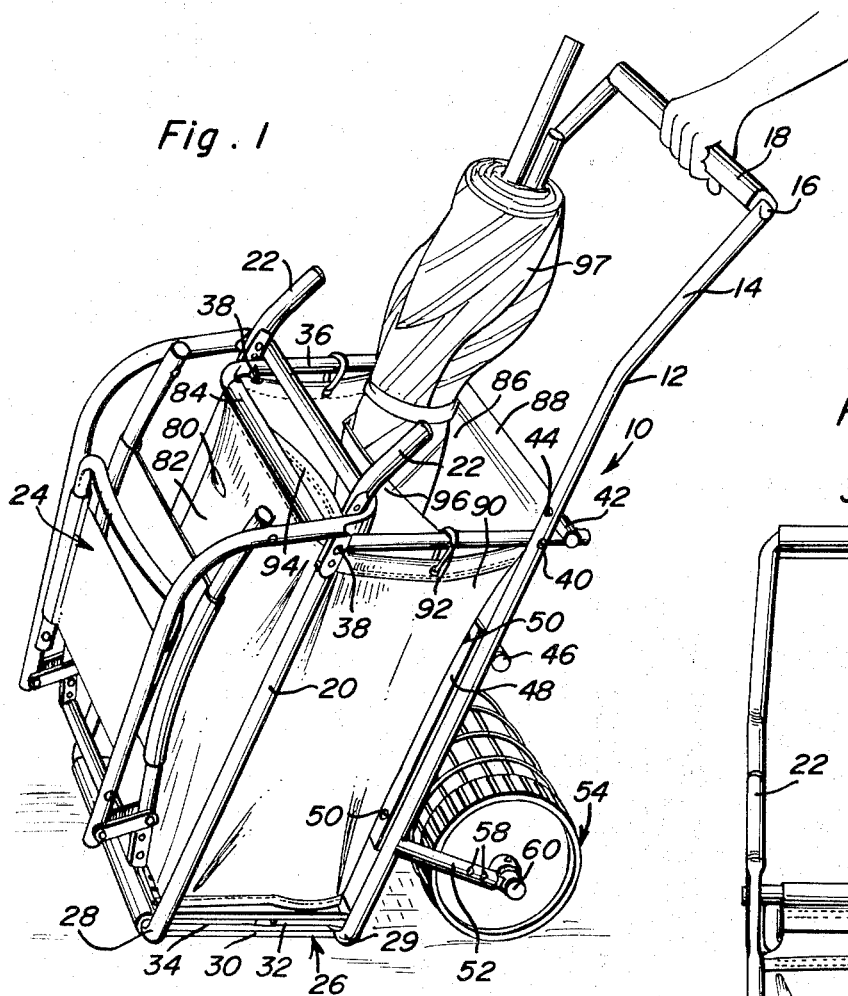
FIG. 1 is a perspective view of the present invention as used.

Referring to the figures and more particularly FIG. 1, reference numeral 10 generally indicates the beach cart of the present invention which includes a rearwardly disposed generally vertical rectangular frame section 12 having an angularly offset upper end portion 14 terminating in a handle bar 16 covered with a cushioning sleeve 18. A generally U-shaped frame section 20 is positioned in forward parallel spaced relation to the frame section 12, the upper ends 22 of the frame section 20 being angularly offset in parallel relation. These upper ends serve as supporting arms for engaging the frame of a folding beach chair 24 of conventional design. By supporting the beach chair as illustrated in FIG. 1, it may be transported effortlessly across a sandy beach. A rigid oblong belt generally indicated by reference numeral 26 encircles the lower horizontal frame sections 28 and 29 that form the lower ends of frame sections 20 and 12, respectively. The rigid belt includes a lower portion 30 that extends laterally outwardly for encircling the frame portions 28 and 29. After encircling contact, the rigid belt extends to inwardly located end portions 32 which lie in overlying spaced relation to the lower portion 30. The gap formed by the open ends of the rigid belt 26 are covered by a base panel 34.

Another U-shaped frame section 36 is horizontally positioned and has its bight portion pivotally connected to the upper vertical end portions of the forward frame section 20. The arms of the U-shaped section 36 extend horizontally rearwardly for pivotal attachment to intermediate points on the vertical portions of the rectangular frame section 12. Suitable pivotal fasteners 38 interconnect the vertical portions 20 of the U-shaped frame 20 and associated abutting points on the horizontally U-shaped frame section 36. Similarly, suitable pivotal fasteners 40 are provided at the intersection between the rectangular frame section 12 and the outward end portions of frame section 36.

It should be mentioned that in a preferred embodiment of the present invention the frame sections are fabricated from tubular steel. However, the frame sections may be made from any suitable material such as plastic or the like.

A tubular section 42 is horizontally connected between aligned points on the vertical portions of the rectangular frame section 12. This latter section 42 serves as a rigidifying link for the rectangular frame section 12. Rivets or other suitable fasteners 44 secure the section 42 to the rectangular frame section 12. A similar tubular section 46 is connected between horizontally aligned points on the vertical portions of the rectangular frame section 12, the section 46 being disposed somewhat intermediate the tubular section 42 and the bottom of the cart frame. This tubular section supplements the rigidification of the aforementioned tubular section 42. A panel 48 fabricated from fiberboard or the like is suitably riveted to the tubular section 46 through abutting points on the rectangular frame section 12. Rivets or other suitable fasteners 50 secure panel 48 to the frame section 12. The panel 48 serves as a retaining support for a bag disposed in the central space of the beach cart as explained hereinafter.

Figure 4:
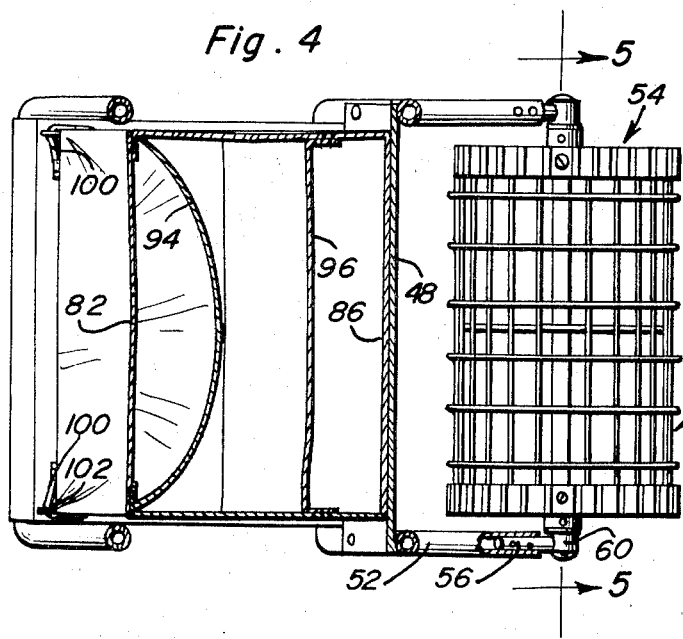
FIG. 4 is a top plan view of the cart.

A pair of downwardly inclined arms 52 extend from the lower portion of the vertical portions of rectangular frame section 12. These arms serve to mount a roller 54 that transports the cart across sand or another type of ground surface. Referring to FIG. 4, the arms 52 are seen to be tubular so that the lower open ends thereof can telescopingly receive respective tubular sections 56 therein. The telescoping relation is fixed by means of suitable setscrew fasteners 58 (FIG. 1). The lower ends of tubular sections 56 terminate in end caps 60 that support the roller 54 as seen in FIG. 5.

Figure 5:
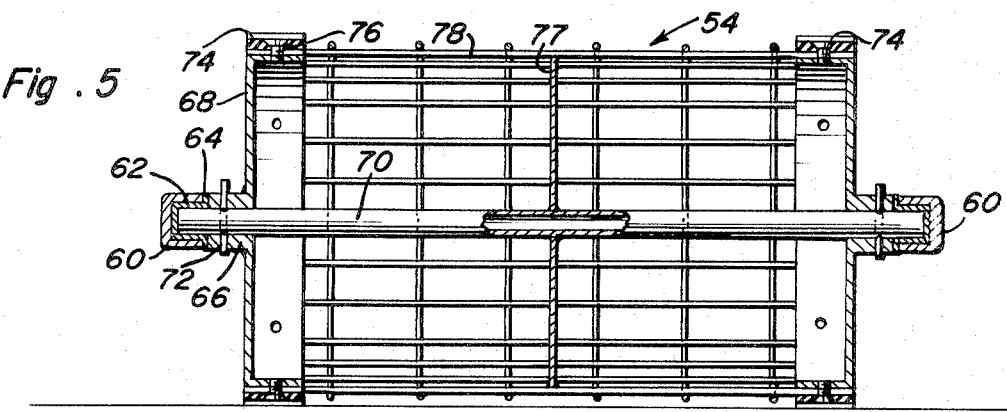
FIG. 5 is a partial sectional view illustrating the component parts of the roller employed in the present invention.

With specific reference to FIG. 5, thrust bearings 62 are seen to be enclosed within the end caps 60. The end caps 60 are fixed to the cart frame. Washer type bearing plates 64 are positioned between the end caps 60 and respective boss portions 66 projecting laterally outwardly from annular plates 68 that define the lateral boundaries of the roller 54. The bosses 66 are fixed by keys 72 to a shaft 70 that is received at the opposite ends thereof in the thrust bearings 62. In operation of roller 54, shaft 70 and annular end plates 68 rotate together relative to the end caps 60. Elastomeric sleeves 74 cover the outer periphery of the end plates 68 and produce quiet operation of the roller on hard pavement. Suitable countersunk fasteners 76 attach the elastomeric sleeves to the end plates. The central portion of roller 54 includes a foraminous wall 78 constructed from longitudinally extending wires that are fixed at opposite ends thereof in the end plates 68. Transversely positioned circular wires intersect the longitudinal wires and complete a screen or mesh pattern that foraminously encloses the space between the end plates. An annular plate 77 is positioned inwardly of the foraminous wall and supports the intermediate section thereof. The plate 77 is suitably welded to the mid-section of shaft 70. The shaft is preferably constructed from tubular material. Utilization of the presently disclosed roller 54 has been found to be quite efficient in sand. Also, by virtue of the inclusion of resilient tread or covers on the annular end plates, the present invention is also adapted for quiet rolling on hard pavement.

Figure 3:
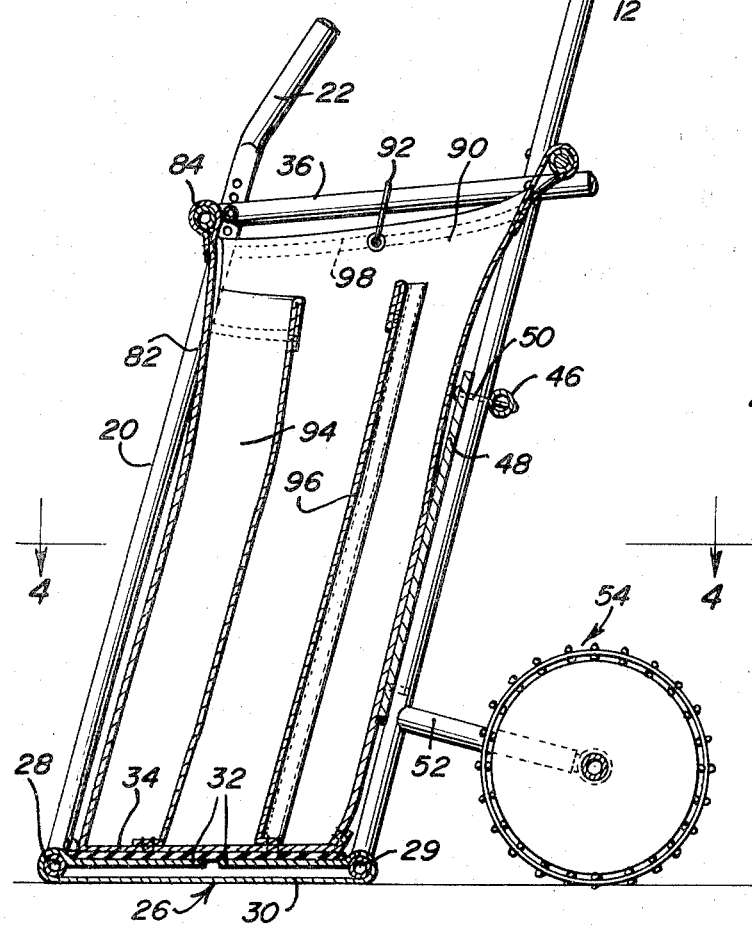
FIG. 3 is a longitudinal sectional view taken along a plane passing through section line 3—3 of FIG. 2.
Figure 6:
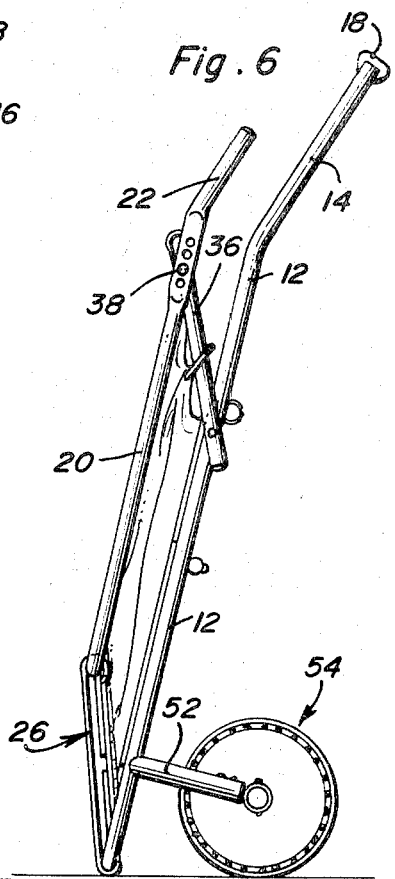
FIG. 6 is an elevational view illustrating the cart in a collapsed position.

Referring once again to FIG. 1, the interior space of the cart frame is seen to receive a bag 80 fabricated from a suitable weather-resistant material such as treated canvas or vinyl-coated nylon. The bag 80 includes a forward panel 82 and a rearward panel 86. These panels have their upper ends 84 and 88, respectively, looped around adjacent portions of the U-shaped section 36 and tubular section 42. Side panels 90 complete the structure of bag 80. The side panels are vertically supported on the arms of the U-shaped frame section 36 by loops 92 extending through grommets that are fastened in the upper end of the side panels. As seen in FIGS. 1, 3, and 4, a flap 94 is sewn at the vertical edges thereof to the forward panel 82 of the bag. This defines a pocket for article storage. Likewise, a second flap 96 is sewn at the vertical edges thereof to the side panels of the bag 80. This forms a pocket that can store a beach article such as an umbrella 97.

Referring to FIG. 3, the upper edge of the bag side walls is shown to be folded over and encloses a resilient reinforcing strip 98. The folded over portions are sewn together so that a wear-resistant edge is produced that will not sag significantly.

Figure 2:
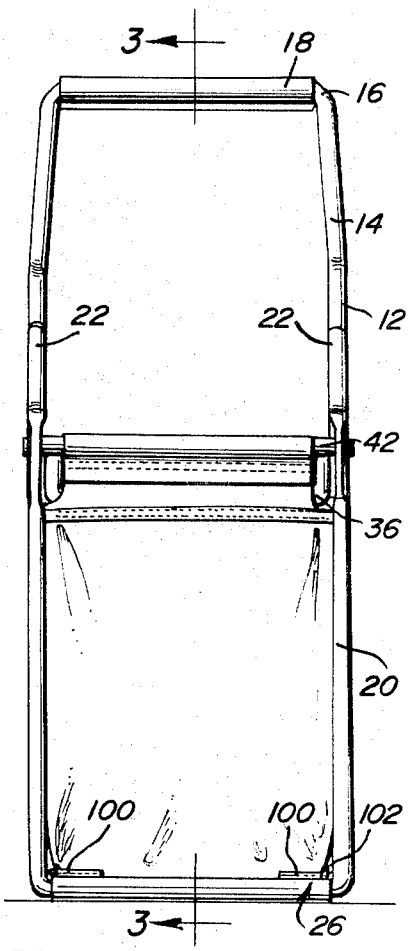
FIG. 2 is an elevational view of the cart illustrated in FIG. 1.

Referring to FIGS. 2 and 3, the forward lower corners of the bag have elastic bands 100 secured thereto. Eye fasteners 102 engage the bands and serve to keep the bag bottom in a fully expanded position when the cart is erected.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vehicle adapted for travel through sand, comprising in combination: collapsible frame; bag means fastened to said frame for holding articles therein; and roller means connected to said frame for transporting the vehicle across sand, and having a pair of end support members, cylindrical foraminous shell extending in connected relation between said end support members, a shaft with spaced ends passing axially through said shell and said end members and means arranged on said shaft for rotatably connecting said ends to said frame, each of said end support members including an annular member, said cylindrical shell being concentrically connected at each end thereof to said annular members and being formed from a plurality of longitudinally extending wires connected to said annular members and a plurality of transversely positioned circular wires connected to said longitudinally extending wires, said annular members having resilient cover means mounted therearound for enabling quiet operation of the roller on solid ground.

2. The structure of claim 1 wherein the frame includes generally parallel forward and rearward frame sections having base portions loosely embraced by a belt enabling the base portions to rotate thereby forcing the forward and rearward frame sections to come together in a collapsed condition. between 3. The structure of claim 2 wherein the vehicle serves as a beach cart and further wherein the frame includes upwardly extending arms for hooking a beach chair thereto, and handle means for propelling the vehicle.

* * * * *